US010634553B1

(12) United States Patent
Hveding et al.

(10) Patent No.: US 10,634,553 B1
(45) Date of Patent: Apr. 28, 2020

(54) HYBRID DISTRIBUTED ACOUSTIC TESTING

(71) Applicants: Saudi Arabian Oil Company, Dhahran (SA); King Abdullah University of Science and Technology, Thuwal (SA)

(72) Inventors: Frode Hveding, Dhahran (SA); Islam Ashry, Thuwal (SA); Mao Yuan, Thuwal (SA); Mohd Sharizal Bin Alias, Thuwal (SA); Boon Siew Ooi, Thuwal (SA); Muhammad Arsalan, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 16/262,477

(22) Filed: Jan. 30, 2019

(51) Int. Cl.
*G01H 9/00* (2006.01)
*G01K 11/32* (2006.01)
*G01D 5/353* (2006.01)
*G01N 21/47* (2006.01)

(52) U.S. Cl.
CPC .......... *G01H 9/004* (2013.01); *G01D 5/35361* (2013.01); *G01D 5/35364* (2013.01); *G01K 11/3206* (2013.01); *G01N 21/47* (2013.01); *G01K 2011/324* (2013.01); *G01N 2021/4709* (2013.01)

(58) Field of Classification Search
CPC ..................... G01D 5/35361; G01D 5/35364
See application file for complete search history.

(56) References Cited

U.S. PATENT DOCUMENTS

| 5,224,182 | A  | 6/1993  | Murphy et al.    |
|-----------|----|---------|------------------|
| 5,892,860 | A  | 4/1999  | Maron et al.     |
| 6,193,079 | B1 | 2/2001  | Weimer           |
| 6,588,266 | B2 | 7/2003  | Tubel et al.     |
| 6,728,165 | B1 | 4/2004  | Roscigno et al.  |
| 7,668,411 | B2 | 2/2010  | Davies et al.    |
| 8,493,556 | B2 | 7/2013  | Li et al.        |
| 8,948,550 | B2 | 2/2015  | Li et al.        |
| 9,499,460 | B2 | 11/2016 | Kawamura et al.  |

(Continued)

FOREIGN PATENT DOCUMENTS

| CN | 101592475 A | * 12/2009 | ............... G01J 1/04 |
| CN | 105043586   | 11/2015   |                           |
| CN | 108534910 A | * 9/2018  |                           |

*Primary Examiner* — Omar R Rojas
(74) *Attorney, Agent, or Firm* — Fish & Richardson P.C.

(57) ABSTRACT

The subject matter of this specification can be embodied in, among other things, a method that includes separating, from a few mode optical fiber, a collection of backscattered Rayleigh signals based on a vibration of the few mode optical fiber at a vibration frequency at a first location along the few mode optical fiber, separating, from the few mode optical fiber, a collection of backscattered Stokes Raman signals and Anti-Stokes Raman signals based on a temperature of the few mode optical fiber at a second location along the few mode optical fiber, detecting the separated Rayleigh signals and Raman signals, determining, based on detecting the collection of backscattered Rayleigh traces, at least one of the first location, the vibration frequency, and an amplitude of the vibration, and determining, based on the detecting the collection of backscattered Raman signals, the temperature at the second location.

23 Claims, 6 Drawing Sheets

(56) References Cited

U.S. PATENT DOCUMENTS

| | | |
|---|---|---|
| 9,581,489 B2 | 2/2017 | Skinner |
| 9,599,460 B2 | 3/2017 | Wang et al. |
| 9,617,847 B2 | 4/2017 | Jaaskelainen et al. |
| 2011/0088462 A1 | 4/2011 | Samson et al. |
| 2018/0052041 A1 | 2/2018 | Yaman et al. |
| 2019/0025095 A1* | 1/2019 | Steel .................. G01D 5/35358 |

* cited by examiner

HYBRID DISTRIBUTED ACOUSTIC TESTING

TECHNICAL FIELD

This instant specification relates to optical fiber vibration and temperature sensors.

BACKGROUND

Among existing approaches for distributed sensing, the fiber optic paradigm is particularly unique, given its numerous advantages, including immunity to electromagnetic interference, miniature sizes, harsh environment operation, and capability of large-scale multiplexing.

One application is an optical fiber distributed acoustic sensor (DAS) designed using phase-sensitive optical time domain reflectometry (ϕ-OTDR). The ϕ-OTDR based DAS has been deployed in applications such as real time structural health monitoring, oil and gas industry, and aerospace transportation. Its operation principle consists of launching a train of optical pulses generated by a narrow linewidth laser into a fiber under test (FUT). At the FUT input port, consecutive Rayleigh backscattered traces are recorded in the time domain. Each Rayleigh trace has a speckle-like profile because of coherent interference of the signals reflected by scattering centers within the injected pulse duration. In the absence of intrusion along the FUT, (such as no refractive index perturbation) the recorded Rayleigh traces are ideally identical. When an acoustic signal is applied at a position along the FUT, the effective refractive index changes at this position, and consequently the intrusion of vibrations from the acoustic signal can be sensed by observing the intensity fluctuation of a corresponding speckle in the recorded traces.

Another application is distributed temperature sensing (DTS). Its operation principle consists of launching a train of optical pulses into the FUT. The pulses are backscattered by thermal excitement of the FUT. At the FUT input port, backscattered Stokes Raman and anti-Stokes Raman signals are compared to determine the temperature of the FUT.

The backscattered power of the Raman signal within an optical fiber is roughly 40 dB (decibels) less than that of the Rayleigh signal. Consequently, in DTS systems, the pump powers that are employed can induce nonlinearity in single mode fibers (SMFs). This fiber nonlinearity, such as stimulated Raman scattering, inhibits the proper operation of DTS systems. Alternatively, multimode fibers (MMFs), which exhibit relatively greater nonlinearity threshold in comparison with SMFs, are used for DTS systems. However, it is difficult to offer MMF-based DAS system because MMF supports propagating huge numbers of modes, and each mode encounters independent interference behavior that is detrimental to Rayleigh signals.

SUMMARY

In general, this document describes techniques and systems for optical fiber vibration and temperature sensing.

In a first aspect, a method for remotely sensing vibration and temperature includes separating, by a wavelength division multiplexing filter and from a few mode optical fiber, a collection of backscattered Rayleigh signals based on a vibration of the few mode optical fiber at a vibration frequency at a first location along the few mode optical fiber. A collection of backscattered Stokes Raman signals and Anti-Stokes Raman signals is separated by the wavelength division multiplexing filter and from the few mode optical fiber, based on a temperature of the few mode optical fiber at a second location along the few mode optical fiber. The separated Rayleigh signals are detected and the separated Stokes Raman signals and Anti-Stokes Raman signals are detected. At least one of the first location in the few mode optical fiber of the vibration, the vibration frequency, and an amplitude of the vibration is determined based on the detecting the collection of backscattered Rayleigh traces. Then the temperature of the few mode fiber at the second location is determined based on the detecting the collection of backscattered Stokes Raman signals and Anti-Stokes Raman signals.

Various implementations can include some, all, or none of the following features. The method can also include demultiplexing, from the few mode optical fiber, the separated backscattered Rayleigh signals, and providing the demultiplexed Rayleigh signals to a single mode optical fiber, wherein detecting the separated Rayleigh signals further comprises detecting the demultiplexed separated Rayleigh signals from the single mode optical fiber. The method can also include demultiplexing, from the few mode optical fiber, the separated backscattered Stokes Raman signals and backscattered Anti-Stokes Raman signals, and providing the demultiplexed Stokes Raman signals and Anti-Stokes Raman signals to the single mode optical fiber, wherein detecting the separated Stokes Raman signals and Anti-Stokes Raman signals can also include detecting the demultiplexed separated Stokes Raman signals and Anti-Stokes Raman signals. The method can also include transmitting a collection of optical pulses through a single mode optical fiber at a predetermined frequency, and injecting the optical pulses into the few mode optical fiber as a predetermined mode through a mode multiplexer. Transmitting a collection of optical pulses through a single mode optical fiber at a predetermined frequency can include generating, by a light source, continuous-wave light, converting, by a first optical modulator, the continuous-wave light into the collection of optical pulses having the predetermined frequency, amplifying, by an optical amplifier, the collection of optical pulses, directing the optical pulses to a first port of an optical circulator, and directing, by the optical circulator, the optical pulses to a second port of the optical circulator in optical communication with the single mode optical fiber. The method can also include receiving, at the second port of the optical circulator, the backscattered Rayleigh signals, and directing the backscattered Rayleigh signals to a third port of the optical circulator, wherein detecting the separated Rayleigh signals can also include receiving the separated Rayleigh signals from the third port. Transmitting a collection of optical pulses through an single mode optical fiber at a predetermined frequency can include transmitting, by a first optical transmitter, a first collection of optical pulses through a first single mode optical fiber to a first port of the multiplexer, and the method can also include transmitting a second collection of optical pulses through a second single mode optical fiber to a second port of the multiplexer.

In a second implementation, a vibration and temperature sensor system includes: a first single mode optical fiber, a few mode optical fiber having a predetermined length, a first light pulse generator configured to provide a first collection of optical pulses to the single mode optical fiber, a multiplexer configured to multiplex optical pulses received from the first single mode optical fiber at a first multiplexer port to the few mode optical fiber, a wavelength division multiplexing filter configured to receive and separate from the few mode optical fiber backscattered Rayleigh signals, backscattered Stokes Raman signals, and backscattered Anti-Stokes Raman signals, and a demultiplexer configured to demultiplex at least one of backscattered Rayleigh signals, backscattered Stokes Raman signals, and backscattered Anti-Stokes Raman signals, from the few mode fiber to the first single mode fiber at a first demultiplexer port. A first sensor is configured to determine at least one of a first location of a vibration in the few mode optical fiber, a frequency of the vibration, and an amplitude of the vibration, based on the backscattered Rayleigh signals, and a second sensor is configured to determine at least one of a second location in the few mode fiber and a temperature at the second location, based on backscattered Stokes Raman signals and backscattered Anti-Stokes Raman signals.

Various embodiments can include some, all, or none of the following features. The first sensor can be configured to receive demultiplexed backscattered Rayleigh signals from the demultiplexer at the first demultiplexer port. The second sensor can be configured to receive demultiplexed backscattered Stokes Raman signals and demultiplexed backscattered Anti-Stokes Raman signals from the demultiplexer at the first demultiplexer port. The second sensor can be configured to receive separated backscattered Stokes Raman signals and separated backscattered Anti-Stokes Raman signals from the wavelength division multiplexing filter. The vibration sensor can also include a second single mode optical fiber, a second light pulse generator configured to provide a second collection of optical pulses to the single mode optical fiber, wherein the multiplexer is further configured to multiplex optical pulses, received from the second single mode optical fiber at a second multiplexer port, to the few mode optical fiber, and wherein the demultiplexer is further configured to demultiplex at least one of backscattered Rayleigh signals, backscattered Stokes Raman signals, and backscattered Anti-Stokes Raman signals, from the few mode fiber to the second single mode fiber at a second demultiplexer port, a third sensor configured to determine at least one of a third location in the few mode fiber and a temperature at the third location, based on backscattered Stokes Raman signals and backscattered Anti-Stokes Raman signals. The third sensor can be configured to receive demultiplexed backscattered Stokes Raman signals and demultiplexed backscattered Anti-Stokes Raman signals from the demultiplexer at the second demultiplexer port. The third sensor can be configured to receive separated backscattered Stokes Raman signals and separated backscattered Anti-Stokes Raman signals from the wavelength division multiplexing filter. The vibration sensor can also include a fourth sensor configured to determine at least one of a fourth location of a vibration in the few mode optical fiber, a frequency of the vibration, and an amplitude of the vibration, based on the backscattered Rayleigh signals. The fourth sensor can be configured to receive demultiplexed backscattered Rayleigh signals from the demultiplexer at the second demultiplexer port.

In a third aspect, a non-transitory computer storage medium is encoded with a computer program. The program includes instructions that, when executed by data processing apparatus, cause the data processing apparatus to perform operations. The operations include separating, by a wavelength division multiplexing filter and from a few mode optical fiber, a collection of backscattered Rayleigh signals based on a vibration of the few mode optical fiber at a vibration frequency at a first location along the few mode optical fiber. A collection of backscattered Stokes Raman signals and Anti-Stokes Raman signals is separated by the wavelength division multiplexing filter and from the few mode optical fiber a based on a temperature of the few mode optical fiber at a second location along the few mode optical fiber. The separated Rayleigh signals are detected, and the separated Stokes Raman signals and Anti-Stokes Raman signals are detected. At least one of the first location in the few mode optical fiber of the vibration, the vibration frequency, and an amplitude of the vibration is determined based on the detecting the collection of backscattered Rayleigh traces. The temperature of the few mode fiber at the second location is determined based on the detecting the collection of backscattered Stokes Raman signals and Anti-Stokes Raman signals.

Various embodiments can include some, all, or none of the following features. The operations can also include demultiplexing, from the few mode optical fiber, the separated backscattered Rayleigh signals, and providing the demultiplexed Rayleigh signals to a single mode optical fiber, wherein detecting the separated Rayleigh signals also includes detecting the demultiplexed separated Rayleigh signals from the single mode optical fiber. The operations can also include demultiplexing, from the few mode optical fiber, the separated backscattered Stokes Raman signals and backscattered Anti-Stokes Raman signals, and providing the demultiplexed Stokes Raman signals and Anti-Stokes Raman signals to the single mode optical fiber, wherein detecting the separated Stokes Raman signals and Anti-Stokes Raman signals can also include detecting the demultiplexed separated Stokes Raman signals and Anti-Stokes Raman signals. The operations can also include transmitting a collection of optical pulses through a single mode optical fiber at a predetermined frequency, and injecting the optical pulses into the few mode optical fiber as a predetermined mode through a mode multiplexer. Transmitting a collection of optical pulses through a single mode optical fiber at a predetermined frequency can include generating, by a light source, continuous-wave light, converting, by a first optical modulator, the continuous-wave light into the collection of optical pulses having the predetermined frequency, amplifying, by an optical amplifier, the collection of optical pulses, directing the optical pulses to a first port of an optical circulator, and directing, by the optical circulator, the optical pulses to a second port of the optical circulator in optical communication with the single mode optical fiber. The operations can also include receiving, at the second port of the optical circulator, the backscattered Rayleigh signals, and directing the backscattered Rayleigh signals to a third port of the optical circulator, wherein detecting the separated Rayleigh signals can also include receiving the separated Rayleigh signals from the third port. Transmitting a collection of optical pulses through an single mode optical fiber at a predetermined frequency can include transmitting, by a first optical transmitter, a first collection of optical pulses through a first single mode optical fiber to a first port of the multiplexer, and the method can also include transmitting a second collection of optical pulses through a second single mode optical fiber to a second port of the multiplexer.

The systems and techniques described here may provide one or more of the following advantages. First, a system can provide simultaneous distributed vibration and temperature sensing using a single platform, which reduces the overall cost of the two individual systems. Second, the system offers DAS with longer sensing range compared with the SMF-based DAS. Third, this design mitigates the dispersion problem found in the typical MMF-based DTS.

The details of one or more implementations are set forth in the accompanying drawings and the description provided in the following paragraphs. Other features and advantages will be apparent from the description and drawings, and from the claims.

DETAILED DESCRIPTION

This document describes systems and techniques for optical fiber vibration and temperature sensing. Optical fibers can be used as a distributed acoustic sensor (DAS) or as a distributed temperature sensor (DTS). The systems and techniques described in this document enable simultaneous measurement of vibration and temperature, remove the need for separate DAS and DTS systems, reduce overall cost, and ensure continuous real-time monitoring of parameters along the pipelines. However, combining the DAS and DTS systems is quite challenging because DAS and DTS implementations use different configurations. For example, the backscattered power of a Raman signal within an optical fiber is roughly 40 dB (decibels) less than that of a Rayleigh signal. Consequently, for DTS systems, the amount of pump power employed can induce nonlinearity in single mode fibers (SMFs). This fiber nonlinearity, such as stimulated Raman scattering, inhibits the proper operation of DTS systems. Multimode fibers (MMFs), which have relatively greater nonlinearity thresholds in comparison with SMFs, are used for DTS systems. However, it is difficult to offer MMF-based DAS system because MMF supports propagating a large number of modes, and each mode encounters independent interference behavior, which is attributable to the production of Rayleigh signals for the measurement of vibration.

In general, to resolve the fiber nonlinearity dilemma and simultaneously keep the DAS operation reliable, a few-mode-fiber (FMF) is used as a compromise between SMF and MMF. In comparison to SMF and MMF, FMF has the following characteristics: 1) commercially available mode multiplexers/demultiplexers (MUX/DEMUX) can be used to easily launch and extract individual modes into and from a FMF, 2) the power threshold of nonlinearity of FMF is higher than that of the SMF, 3) a FMF guides a restricted number of spatial modes, typically less than 20 modes, such that intermodal coupling and differential mode group delays within the FMF can be controlled and managed. Given these unique specifications of FMF, optical pulses that are relatively more powerful than optical pulses that can be used with SMF can be pumped into a FMF to extract Raman signals without reaching nonlinearity, and simultaneously separate the interference behavior of the individual modes required for DAS.

Figure 1:
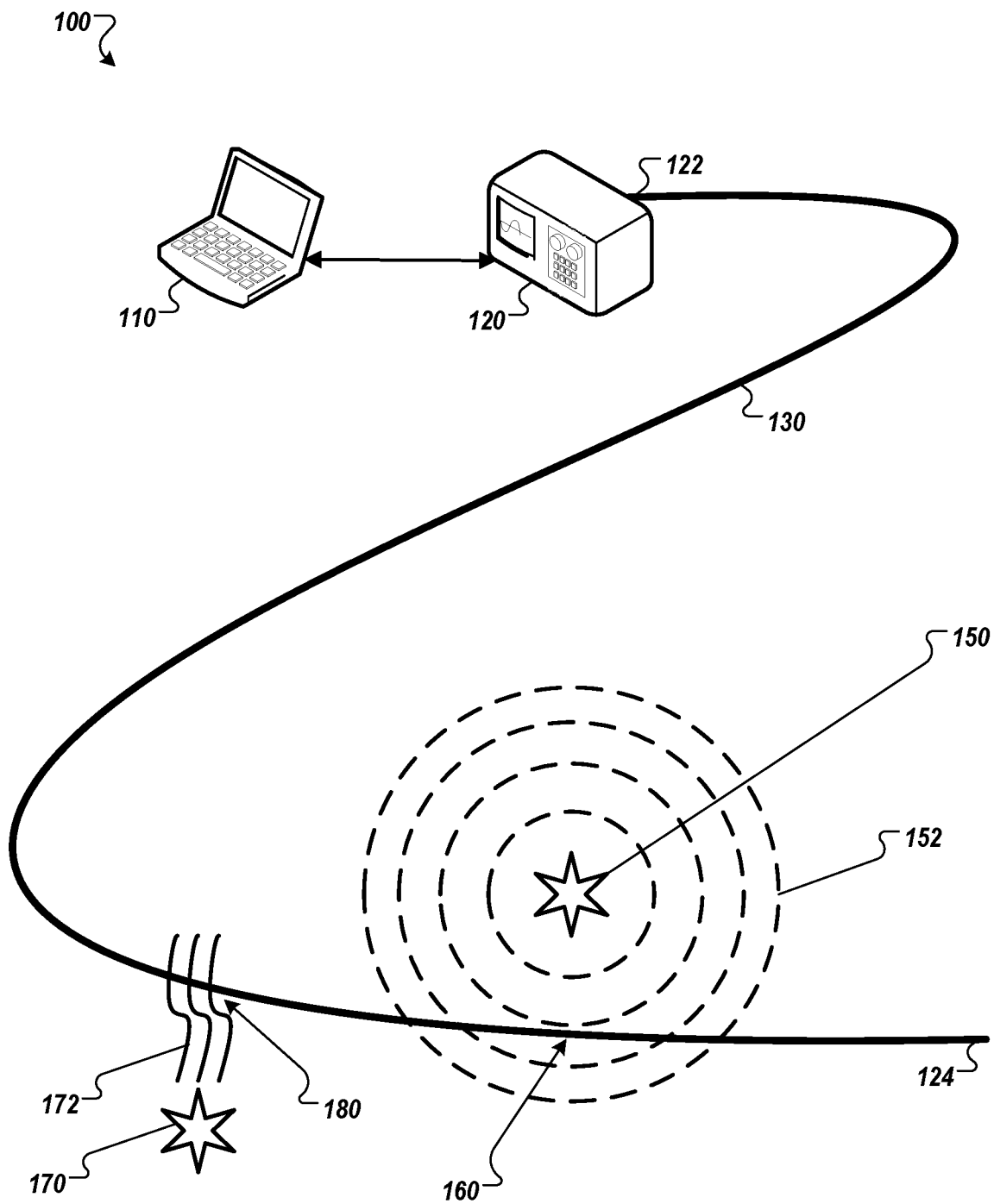
FIG. 1 is a schematic diagram that shows an example of a system for remotely sensing vibration and temperature.

FIG. 1 is a schematic diagram that shows an example of a system 100 for remotely sensing vibration and temperature. The system 100 is a hybrid optical fiber distributed acoustic sensor (DAS) and distributed temperature sensor (DTS) system that includes a computing system 110, a sensor system 120, and a fiber under test (FUT) 130. The computing system 110 is in electronic communication with the sensor system 120 (such as through a network connection or a universal serial bus connection).

The FUT 130 is an optical fiber that is optically coupled to the sensor system 120 at a proximal end 122 and extends a distance (multiple kilometers, for example) to a distal end 124. In the illustrated example, a vibration source 150 emits vibrations 152 at a particular frequency. The vibrations 152 intersect the FUT 130 and vibrate the FUT 130 at, near, or around a location 160. A thermal source 170 emits heat energy 172 that changes the temperature of the FUT 103 at, near, or around a location 180.

The system 100 uses a technique that improves the performance of both DTS and DAS using the same FUT. In general, and as will be discussed in more detail later, a fiber mode multiplexer/demultiplexer and a few-mode fiber (FMF) is used to improve signal discrimination among multiple optical backscatterings.

Figure 2A:
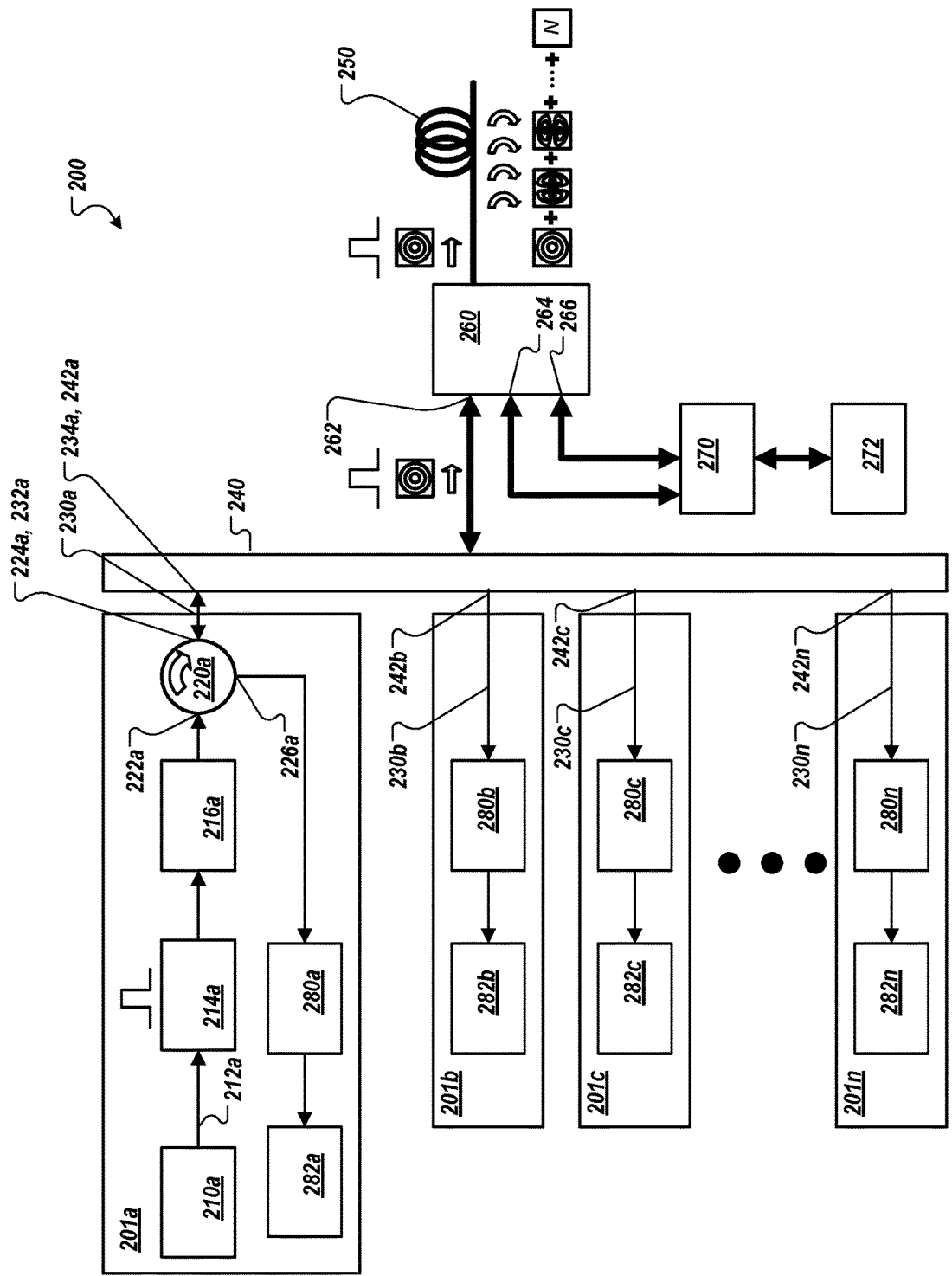
FIGS. 2A and 2B are block diagrams that show an example of a system for remotely sensing vibration and temperature.

FIG. 2A is a block diagram that shows an example of a system 200 for remotely sensing vibration and temperature. In some implementations, the system 200 can be the example system 100 of FIG. 1.

The system 200 includes a light pulse assembly 201a. A light source 210a of the light pulse assembly 201a emits light into a single mode fiber (SMF) 212a. In the illustrated example, the light source 210a is a narrow-linewidth (1 kilohertz (kHz), for example) laser source that generates continuous-wave (CW) light. The laser light is modulated by a modulator 214a to produce optical pulses.

The modulated light is amplified by an optical amplifier 216a. The amplified modulated light is provided to an optical port 222a of an optical circulator 220a. The optical circulator 220a provides the amplified modulated light to an optical port 224a that is optically coupled to a proximal end 232a of a single mode fiber 230a. In some embodiments, the optical amplifier 216a may be omitted.

A distal end 234a of the single mode fiber 230a is optically coupled to an optical port 242a of a mode multiplexer (MUX) 240. The mode multiplexer 240 is an optical coupler that allows several standard single mode optical fiber inputs to be selectively converted into the individual modes of a few mode fiber (FMF) 250. In the illustrated example, mode multiplexer 240 is configured to couple the optical port 242a to mode 0 (zero) of the few mode fiber 250.

In this document, the term "multiplexer" can also include bidirectional mode multiplexer/demultiplexers (MUX/DEMUX). In the illustrated example, the mode multiplexer 240 is also a mode demultiplexer that allows individual modes of a few mode fiber at an optical fiber input to be selectively converted into the individual single mode optical fibers. In some embodiments, a device that is configured to perform only mode multiplexing may be used in cooperation with a device that is configured to perform only mode demultiplexing.

After launching the optical pulses into the few mode fiber 250, light is coupled to a bidirectional wavelength division multiplexing (WDM) filter 260, which spectrally resolves Rayleigh, Stokes Raman, and Anti-Stokes Raman signals. Since Rayleigh scattering occurs at the same wavelength of the input pump light, the optical pulses get into the WDM 260 filter through a Rayleigh port 262. While an optical pulse is propagating along the few mode fiber 250, Rayleigh and Raman signals of the whole modes are backscattered.

In the illustrated example, the few mode fiber 250 several kilometers (km) long (such as 4 km), but this is just one example. In various implementations, any appropriate length of fiber can be used. In some implementations, the few mode fiber 250 can be strung along a region to be monitored, and vibrations and temperatures from sources can be monitored along a region near the few mode fiber 250. For example, the few mode fiber 250 could be extended in buildings, oil/gas wells, or industrial sites to sense vibrations and temperatures, which might be produced by structural cracks, oil/gas flows, or human/machines activities.

As a launched pulse propagates within the few mode fiber 250, part of its power is backscattered by the optical phenomena such as Rayleigh scattering, Stokes Raman scattering, and anti-Stokes Raman scattering. When photons are scattered from an atom or molecule, most of them are elastically scattered (Rayleigh scattering). A fraction of the scattered photons are scattered inelastically by an excitation (Raman Effect), with the scattered photons having a frequency and energy different from, and usually less than, those of the incident photons. The Raman interaction leads to two possible outcomes. In one outcome, the material that interacts with the photons absorbs some of the photons' energy and the emitted photons have less energy than the absorbed photons. This outcome is referred to as Stokes Raman scattering. In the other outcome, the material loses energy and the emitted photons have more energy than the absorbed photons. This outcome is labeled anti-Stokes Raman scattering.

In the backward direction, the bidirectional WDM filter 260 separates the Rayleigh, Stokes Raman, and Anti-Stokes Raman signals. The two Stokes Raman signal is directed to a port 264, and the Anti-Stokes Raman signal is directed to a port 266. The Stokes Raman and Anti-Stokes Raman signals are directed towards a receiver 270 for light detection and data acquisition. A signal processor 272 processes the acquired Raman data and provides information that describes the distribution of temperatures along the few mode fiber 250. In some embodiments, the receiver 270 can include an optical amplifier. A photodetector can be configured to convert light intensities into electrical signals. The filtered backscattered traces can be sensed by the photodetector, and the photodetector can provide representative electrical signals to an analog-to-digital (ND) converter. The analog-to-digital converter can be configured to sample the electrical signals from the photodetector and provide representative digital data to the signal processor 272 for further processing, presentation (for example, to a user), or both.

The spectrally filtered backscattered Rayleigh signal is directed by the WDM 260 filter through the Rayleigh port 262 to the mode multiplexer 240. Depending on the mode of the few mode fiber 250 that carries the backscattered signal, the mode multiplexer 240 directs the backscattered signal to the optical port 242*a* or another one of a collection of optical ports 242*b*-242*n*. In the illustrated example, since the optical pulses were directed to mode 0 (zero) of the few mode fiber 250, then most of the backscattered Rayleigh signals will be returned though mode 0, and as such, the backscattered signals will be demultiplexed to the optical port 242*a* and the single mode fiber 230*a*.

The remaining backscattered Rayleigh signals guided by other modes of the few mode fiber 250 will be directed to other ports of the mode multiplexer 240. Signals backscattered on mode 1 are demultiplexed to the optical port 242*b* and guided to a light pulse assembly 201*b* by a single mode fiber 230*b*. Signals backscattered on mode 2 are demultiplexed to the optical port 242*c* and guided to a light pulse assembly 201*c* by a single mode fiber 230*c*. Signals backscattered on mode N are demultiplexed to the optical port 242*n* and guided to a light pulse assembly 201*n* by a single mode fiber 230*n*.

To analyze the backscattered Rayleigh signal on mode 0 (zero), the Rayleigh signals are directed by the optical circulator 220*a* to an optical port 226*a* that is optically coupled to a receiver 280*a* for amplification, detection, and data acquisition. Finally, a signal processor 282*a* (such as a computer, an oscilloscope) processes the acquired Rayleigh data and provides information that describes the distribution of vibration locations, amplitudes, and frequencies along the few mode fiber 250.

To analyze the backscattered Rayleigh signal on mode 1 (one), the Rayleigh signals are directed by the mode multiplexer 240 a receiver 280*b* for amplification, detection, and data acquisition. A signal processor 282*b* (such as a computer, an oscilloscope) processes the acquired Rayleigh data and provides information that describes the distribution of vibration locations, amplitudes, and frequencies along the few mode fiber 250. To analyze the backscattered Rayleigh signal on mode 2 (two), the Rayleigh signals are directed by the mode multiplexer 240 a receiver 280*c* for amplification, detection, and data acquisition. A signal processor 282*c* (such as a computer, an oscilloscope) processes the acquired Rayleigh data and provides information that describes the distribution of vibration locations, amplitudes, and frequencies along the few mode fiber 250. To analyze the backscattered Rayleigh signal on mode n, the Rayleigh signals are directed by the mode multiplexer 240 a receiver 280*n* for amplification, detection, and data acquisition. A signal processor 282*n* (such as a computer, an oscilloscope) processes the acquired Rayleigh data and provides information that describes the distribution of vibration locations, amplitudes, and frequencies along the few mode fiber 250.

In some embodiments, the receivers 280*a*-208*n* can include an optical amplifier. The Rayleigh traces can be amplified by the erbium-doped fiber amplifier, and the amplified spontaneous emission (ASE) noise of the amplified traces can be filtered out by a fiber Bragg grating. A photodetector can configured to convert light intensities into electrical signals. The filtered backscattered traces can be sensed by the photodetector, and the photodetector can provide representative electrical signals to an analog-to-digital (A/D) converter. The analog-to-digital converter can be configured to sample the electrical signals from the photodetector and provide representative digital data to the signal processors 282*a*-282*n* for further processing, presentation (for example, to a user), or both.

Figure 2B:
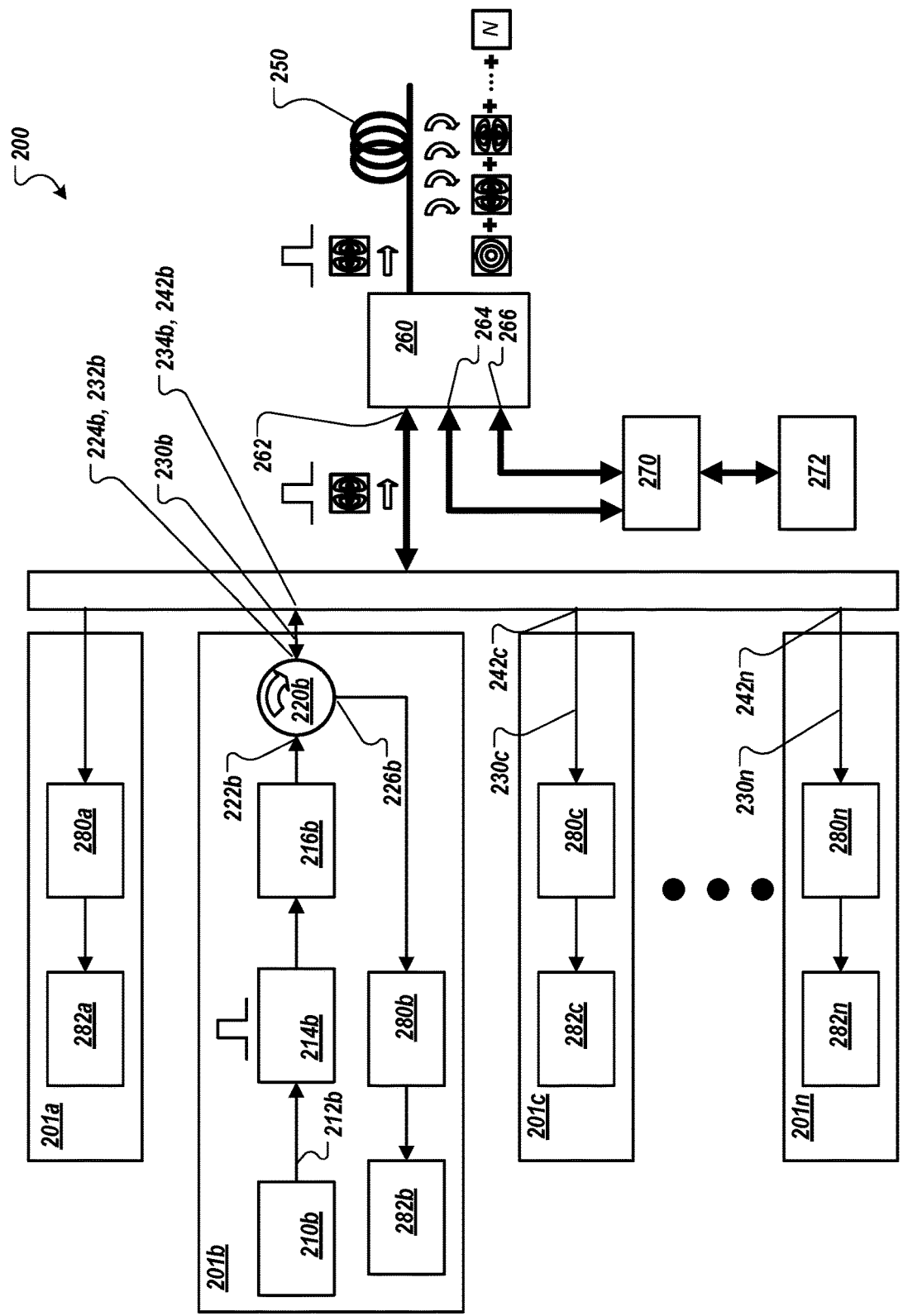

FIG. 2B is a block diagram that shows an example of the system 200 in a configuration that transmits light pulses and receives most of the backscattered Rayleigh signals using mode 1 of the few mode fiber 250.

The system 200 includes the light pulse assembly 201*b*. The light pulse assembly 201*b* has a configuration and use that is similar to the light pulse assembly 201*a*. A light source 210*b* of the light pulse assembly 201*b* emits continuous-wave (CW) light into a single mode fiber (SMF) 212*b*. The laser light is modulated by a modulator 214*b* to produce optical pulses.

The modulated light is amplified by an optical amplifier 216*b*. The amplified modulated light is provided to an optical port 222*b* of an optical circulator 220*b*. The optical circulator 220*b* provides the amplified modulated light to an optical port 224*b* that is optically coupled to a proximal end 232*b* of a single mode fiber 230*b*. In some embodiments, the optical amplifier 216*b* may be omitted.

A distal end 234b of the single mode fiber 230b is optically coupled to the optical port 242b of a mode multiplexer (MUX) 240. In the illustrated example, mode multiplexer 240 is configured to couple the optical port 242b to mode 1 (one) of the few mode fiber 250.

The spectrally filtered backscattered Rayleigh signal is directed by the WDM 260 filter through the Rayleigh port 262 to the mode multiplexer 240. In the illustrated example, since the optical pulses were directed to mode 1 (one) of the few mode fiber 250, then most of the backscattered Rayleigh signals will be returned though mode 1, and as such the backscattered signals will be demultiplexed to the optical port 242b and the single mode fiber 230b.

To analyze the backscattered Rayleigh signal on mode 1 (one), the Rayleigh signals are directed by the optical circulator 220b to an optical port 226b that is optically coupled to a receiver 280b for amplification, detection, and data acquisition. A signal processor 282b (such as a computer, an oscilloscope) processes the acquired Rayleigh data and provides information that describes the distribution of vibration locations, amplitudes, and frequencies along the few mode fiber 250.

To analyze the backscattered Rayleigh signal on mode 0 (zero), the Rayleigh signals are directed by the mode multiplexer 240 the receiver 280a for amplification, detection, and data acquisition. The signal processor 282a processes the acquired Rayleigh data and provides information that describes the distribution of vibration locations, amplitudes, and frequencies along the few mode fiber 250. To analyze the backscattered Rayleigh signal on mode 2 (two), the Rayleigh signals are directed by the mode multiplexer 240 the receiver 280c for amplification, detection, and data acquisition. The signal processor 282c processes the acquired Rayleigh data and provides information that describes the distribution of vibration locations, amplitudes, and frequencies along the few mode fiber 250. To analyze the backscattered Rayleigh signal on mode n, the Rayleigh signals are directed by the mode multiplexer 240 the receiver 280n for amplification, detection, and data acquisition. The signal processor 282n processes the acquired Rayleigh data and provides information that describes the distribution of vibration locations, amplitudes, and frequencies along the few mode fiber 250.

Figure 3A:
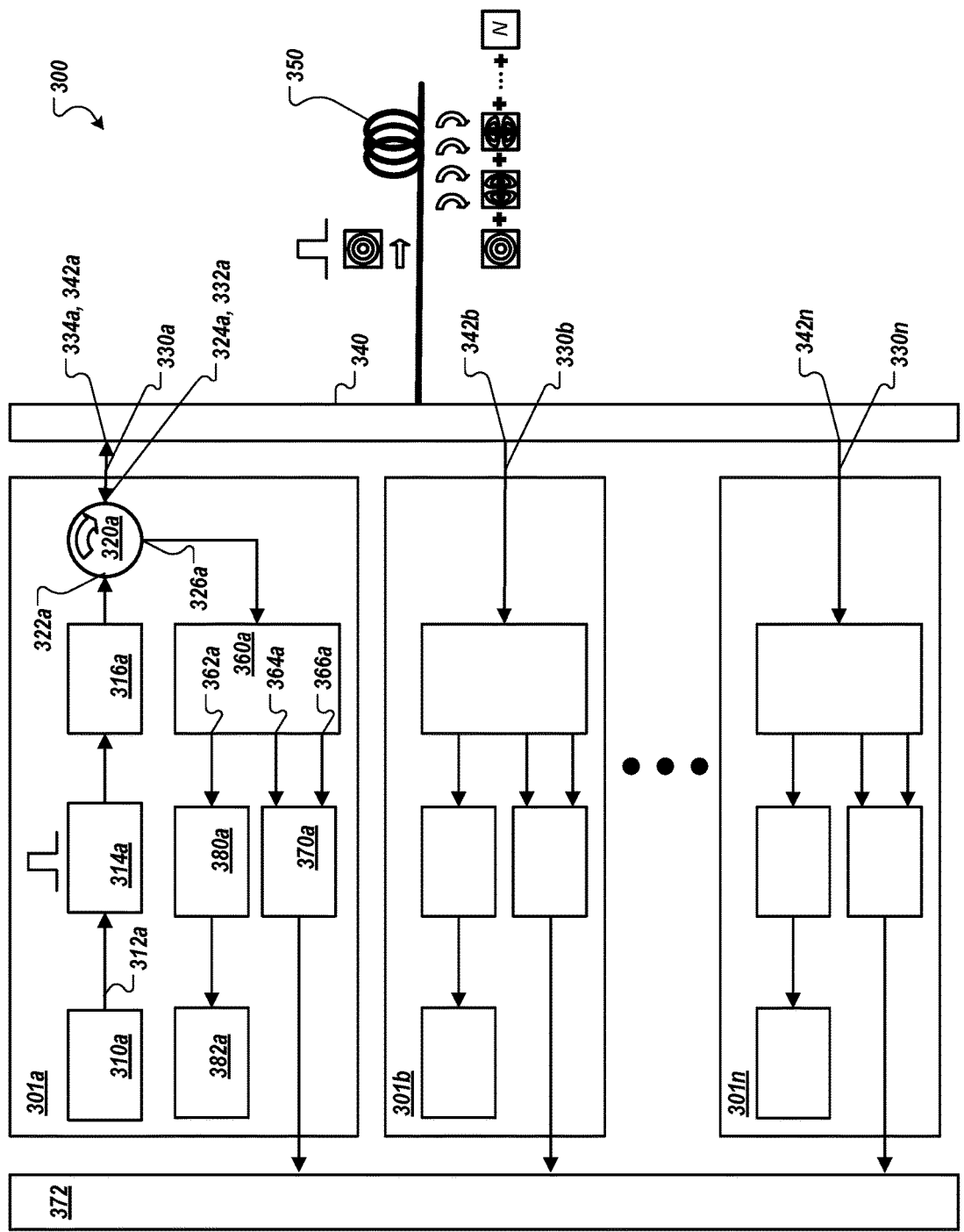
FIGS. 3A and 3B are block diagrams that show another example of a system for remotely sensing vibration and temperature.

FIG. 3A is a block diagram that shows an example of a system 300 for remotely sensing vibration and temperature. In some implementations, the system 300 can be the example system 100 of FIG. 1.

The system 300 includes a light pulse assembly 301a. A light source 310a of the light pulse assembly 301a emits light into a single mode fiber (SMF) 312a. In the illustrated example, the light source 310a is a narrow-linewidth (1 kHz, for example) laser source that generates continuous-wave (CW) light. The laser light is modulated by a modulator 314a to produce optical pulses.

The modulated light is amplified by an optical amplifier 316a. The amplified modulated light is provided to an optical port 322a of an optical circulator 320a. The optical circulator 320a provides the amplified modulated light to an optical port 324a that is optically coupled to a proximal end 332a of a single mode fiber 330a. In some embodiments, the optical amplifier 316a may be omitted.

A distal end 334a of the single mode fiber 330a is optically coupled to an optical port 342a of a mode multiplexer (MUX) 340. The mode multiplexer 340 is an optical coupler that allows several standard single mode optical fiber inputs to be selectively converted into the individual modes of a few mode fiber (FMF) 350. In the illustrated example, mode multiplexer 340 is configured to couple the optical port 342a to mode 0 (zero) of the few mode fiber 350.

As discussed in previous paragraphs, in this document the term "multiplexer" can also include bidirectional mode multiplexer/demultiplexers (MUX/DEMUX). In the illustrated example, the mode multiplexer 340 is also a mode demultiplexer that allows individual modes of a few mode fiber at an optical fiber input to be selectively converted into the individual single mode optical fibers. In some embodiments, a device that is configured to perform only mode multiplexing may be used in cooperation with a device that is configured to perform only mode demultiplexing.

In the illustrated example, the few mode fiber 350 can be several kilometers (km) long (such as 4 km), but this is just one example. In various implementations, any appropriate length of fiber can be used. In some implementations, the few mode fiber 350 can be strung along a region to be monitored, and vibrations and temperatures from sources can be monitored along a region near the few mode fiber 350. For example, the few mode fiber 350 could be extended in buildings, oil/gas wells, or industrial sites to sense vibrations and temperatures, which might be produced, by structural cracks, oil/gas flows, or human/machines activities.

As a launched pulse propagates within the few mode fiber 350, part of its power is backscattered by the optical phenomena such as Rayleigh scattering, Stokes Raman scattering, and anti-Stokes Raman scattering. The backscattered light is directed to the mode multiplexer 340. Depending on the mode of the few mode fiber 350 that carries the backscattered signal, the mode multiplexer 340 directs the backscattered signal to the optical port 342a or another one of a collection of optical ports 342b-342n. In the illustrated example, since the optical pulses were directed to mode 0 (zero) of the few mode fiber 350, then most of the backscattered signals will be returned though mode 0, and as such, the backscattered signals will be demultiplexed to the optical port 342a and the single mode fiber 330a.

The backscattered signals on mode 0 are directed by the optical circulator 320a to an optical port 326a that is optically coupled to a wavelength division multiplexing (WDM) filter 360a which spectrally resolves Rayleigh, Stokes Raman, and Anti-Stokes Raman signals. The WDM filter 360a separates the Rayleigh, Stokes Raman, and Anti-Stokes Raman signals. The Rayleigh signal is directed to a port 362a, the Stokes Raman signal is directed to a port 364a, and the Anti-Stokes Raman signal is directed to a port 366a. The Stokes Raman and Anti-Stokes Raman signals are directed towards a receiver 370a for light detection and data acquisition. A signal processor 372 processes the acquired Raman data and provides information that describes the distribution of temperatures along the few mode fiber 350.

In some embodiments, the receiver 370a can include an optical amplifier. A photodetector can configured to convert light intensities into electrical signals. The filtered backscattered traces can be sensed by the photodetector, and the photodetector can provide representative electrical signals to an analog-to-digital (ND) converter. The analog-to-digital converter can be configured to sample the electrical signals from the photodetector and provide representative digital data to the signal processor 372 for further processing, presentation (for example, to a user), or both.

To analyze the backscattered Rayleigh signal on mode 0 (zero), the Rayleigh signals are directed by the WDM 360a to a receiver 380a for amplification, detection, and data acquisition. Finally, a signal processor 382a (such as a computer, an oscilloscope) processes the acquired Rayleigh data and provides information that describes the distribution of vibration locations, amplitudes, and frequencies along the few mode fiber 350.

In some embodiments, the receiver 380a can include an optical amplifier. The Rayleigh traces can be amplified by the erbium-doped fiber amplifier, and the amplified spontaneous emission (ASE) noise of the amplified traces can be filtered out by a fiber Bragg grating. A photodetector can configured to convert light intensities into electrical signals. The filtered backscattered traces can be sensed by the photodetector, and the photodetector can provide representative electrical signals to an analog-to-digital (A/D) converter. The analog-to-digital converter can be configured to sample the electrical signals from the photodetector and provide representative digital data to the signal processor 382a for further processing, presentation (for example, to a user), or both.

The remaining backscattered signals guided by other modes of the few mode fiber 350 will be directed to other ports of the mode multiplexer 340. Signals backscattered on mode 1 are demultiplexed to the optical port 342b and guided to a light pulse assembly 301b by a single mode fiber 330b. Signals backscattered on mode n are demultiplexed to the optical port 342n and guided to a light pulse assembly 301n by a single mode fiber 330n.

Figure 3B:
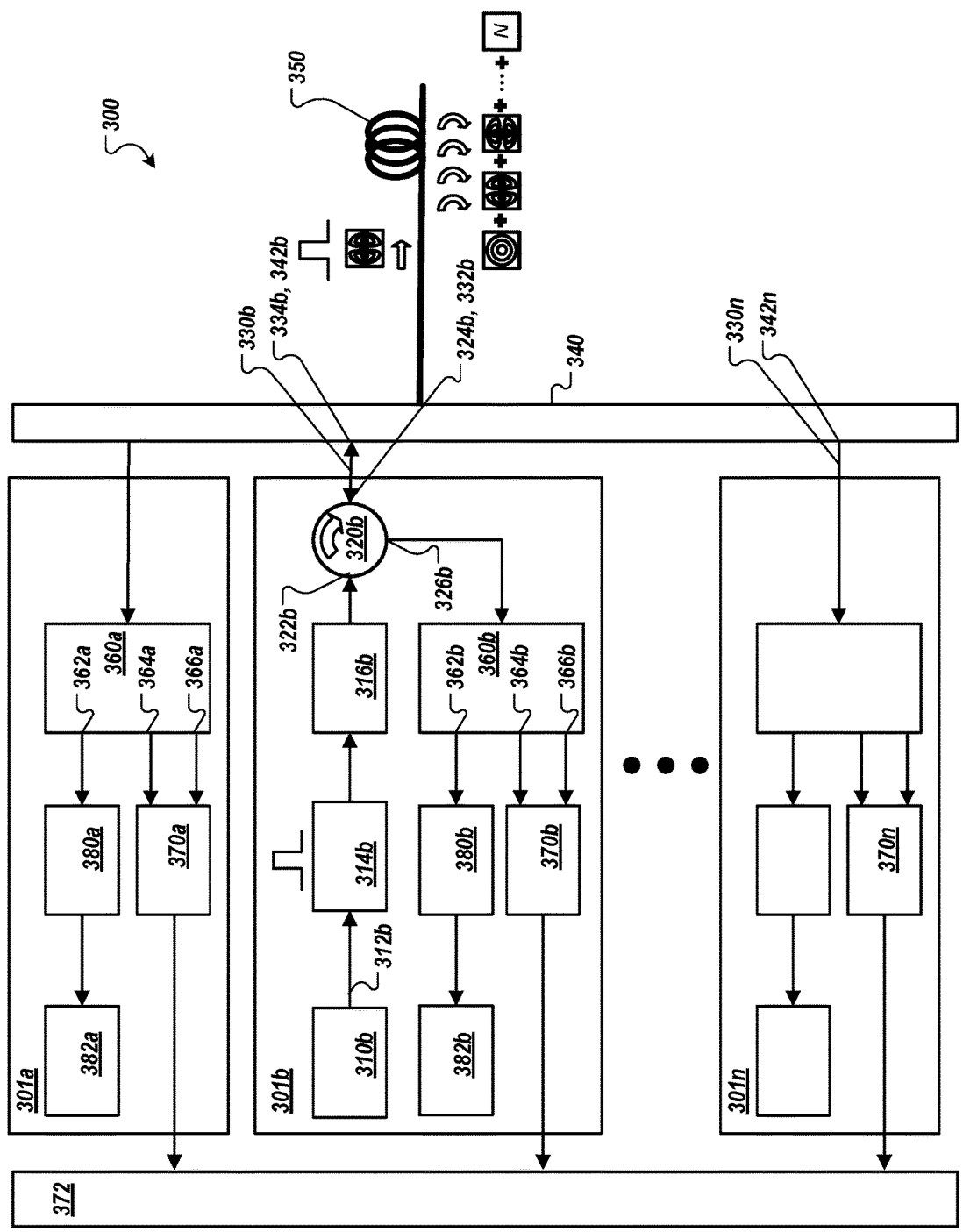

FIG. 3B is a block diagram that shows an example of the system 300 in a configuration that transmits light pulses and receives most of backstattered signals using mode 1 of the few mode fiber 350.

The system 300 includes the light pulse assembly 301b. A light source 310b of the light pulse assembly 301b emits light into a single mode fiber (SMF) 312b. In the illustrated example, the light source 310b is a narrow-linewidth (1 kHz, for example) laser source that generates continuous-wave (CW) light. The laser light is modulated by a modulator 314b to produce optical pulses.

The modulated light is amplified by an optical amplifier 316b. The amplified modulated light is provided to an optical port 322b of an optical circulator 320b. The optical circulator 320b provides the amplified modulated light to an optical port 324b that is optically coupled to a proximal end 332b of the single mode fiber 330b. In some embodiments, the optical amplifier 316b may be omitted.

A distal end 334b of the single mode fiber 330b is optically coupled to an optical port 342b of the mode multiplexer (MUX) 340. In the illustrated example, mode multiplexer 340 is configured to couple the optical port 342b to mode 1 (one) of the few mode fiber 350.

As discussed in previous paragraphs, in this document the term "multiplexer" can also include bidirectional mode multiplexer/demultiplexers (MUX/DEMUX). In the illustrated example, the mode multiplexer 340 is also a mode demultiplexer that allows individual modes of a few mode fiber at an optical fiber input to be selectively converted into the individual single mode optical fibers. In some embodiments, a device that is configured to perform only mode multiplexing may be used in cooperatively with a device that is configured to perform only mode demultiplexing.

The backscattered light is directed to the mode multiplexer 340. Depending on the mode of the few mode fiber 350 that carries the backscattered signal, the mode multiplexer 340 directs the backscattered signal to the optical port 342b or another one of the optical ports 342b-342n. In the illustrated example, since the optical pulses were directed to mode 1 (one) of the few mode fiber 350, then most of the backscattered signals will be returned though mode 1, and as such the backscattered signals will be demultiplexed to the optical port 342b and the single mode fiber 330b.

The backscattered signals on mode 1 are directed by the optical circulator 320b to an optical port 326b that is optically coupled to a wavelength division multiplexing (WDM) filter 360b which spectrally resolves Rayleigh, Stokes Raman, and Anti-Stokes Raman signals. The WDM filter 360b separates the Rayleigh, Stokes Raman, and Anti-Stokes Raman signals. The Rayleigh signal is directed to a port 362b, the Stokes Raman signal is directed to a port 364b, and the Anti-Stokes Raman signal is directed to a port 366b. The Stokes Raman and Anti-Stokes Raman signals are directed towards a receiver 370b for light detection and data acquisition. The signal processor 372 processes the acquired Raman data and provides information that describes the distribution of temperatures along the few mode fiber 350.

In some embodiments, the receiver 370b can include an optical amplifier. A photodetector can configured to convert light intensities into electrical signals. The filtered backscattered traces can be sensed by the photodetector, and the photodetector can provide representative electrical signals to an analog-to-digital (A/D) converter. The analog-to-digital converter can be configured to sample the electrical signals from the photodetector and provide representative digital data to the signal processor 372 for further processing, presentation (for example, to a user), or both.

To analyze the backscattered Rayleigh signal on mode 1 (one), the Rayleigh signals are directed by the WDM 360b to a receiver 380b for amplification, detection, and data acquisition. Finally, a signal processor 382b (such as a computer, an oscilloscope) processes the acquired Rayleigh data and provides information that describes the distribution of vibration locations, amplitudes, and frequencies along the few mode fiber 350.

In some embodiments, the receiver 380b can include an optical amplifier. The Rayleigh traces can be amplified by the erbium-doped fiber amplifier, and the amplified spontaneous emission (ASE) noise of the amplified traces can be filtered out by a fiber Bragg grating. A photodetector can configured to convert light intensities into electrical signals. The filtered backscattered traces can be sensed by the photodetector, and the photodetector can provide representative electrical signals to an analog-to-digital (A/D) converter. The analog-to-digital converter can be configured to sample the electrical signals from the photodetector and provide representative digital data to the signal processor 382b for further processing, presentation (for example, to a user), or both.

The remaining backscattered signals guided by other modes of the few mode fiber 350 will be directed to other ports of the mode multiplexer 340. Signals backscattered on mode 0 are demultiplexed to the optical port 342a and guided to a light pulse assembly 301a by a single mode fiber 330a. Signals backscattered on mode n are demultiplexed to the optical port 342n and guided to a light pulse assembly 301n by a single mode fiber 330n.

Figure 4:
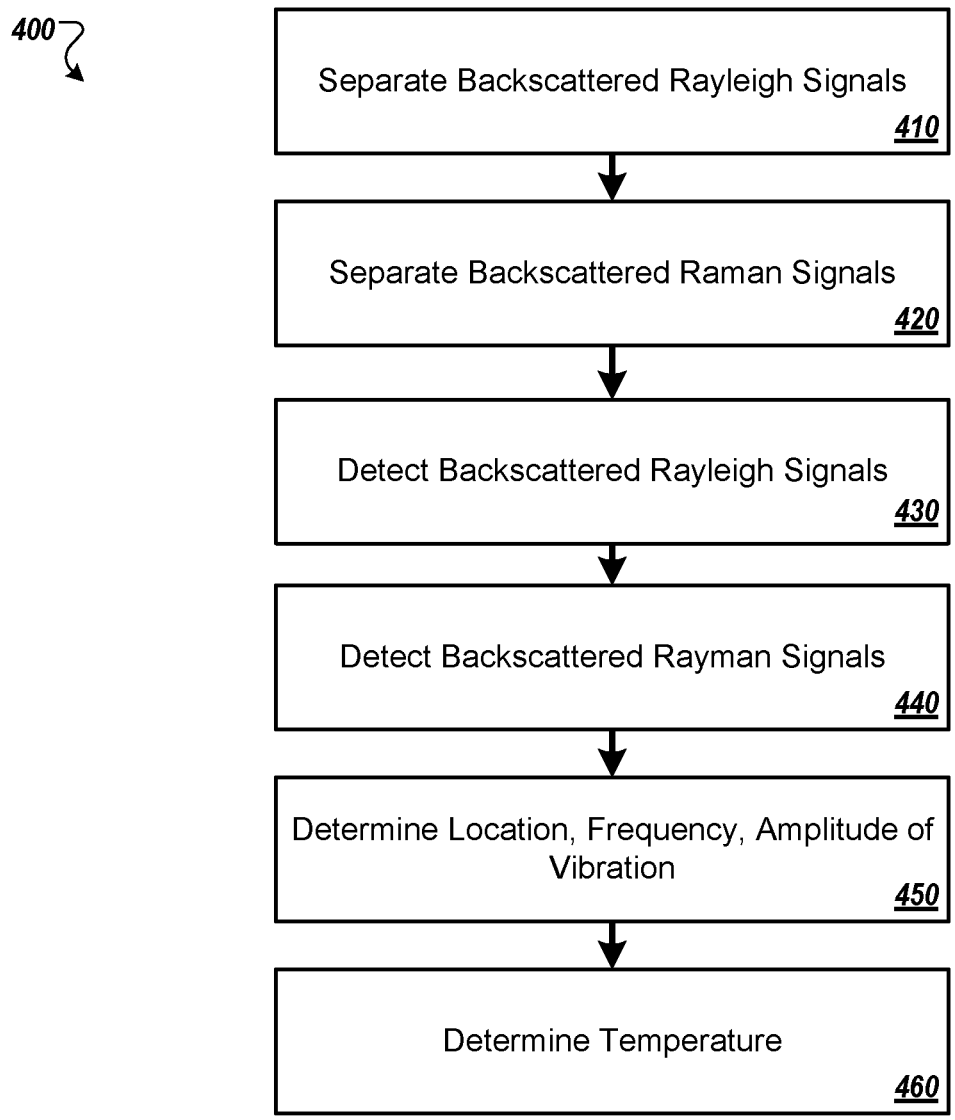
FIG. 4 is flow chart that shows an example of a process for remotely sensing vibration and temperature.

FIG. 4 is a flow chart that shows an example of a process 400 for optical fiber vibration and temperature sensing. The process 400 may be performed, for example, by a system such as the example system 100, the example system 200, and the example system 300.

At 410, a wavelength division multiplexing filter separates, from a few mode optical fiber, a collection of backscattered Rayleigh signals based on a vibration of a few mode optical fiber at a vibration frequency at a first location along the few mode optical fiber. For example, the WDM 260 separates backscattered Rayleigh signals received from the few mode optical fiber 250.

At 420, the wavelength division multiplexing filter separates from the few mode optical fiber a collection of backscattered Stokes Raman signals and Anti-Stokes Raman signals based on a temperature of the few mode optical fiber at a second location along the few mode optical fiber. For example, the WDM 260 separates backscattered Raman signals received from the few mode optical fiber 250.

At 430, the separated Rayleigh signals are detected. For example, receiver 280a detects the Rayleigh signals and converts them to electrical signals.

At 440, the separated Stokes Raman signals and Anti-Stokes Raman signals are detected. For example, the receiver 270 detects the Raman signals and converts them to electrical signals.

At 450, at least one of the first location in the few mode optical fiber of the vibration, the vibration frequency, and an amplitude of the vibration is determined based on the detecting the collection of backscattered Rayleigh traces. For example, the signal processor 282a can analyze the signals provided by the receiver 280a to determine the location of the vibration 152, the frequency of the vibrations 152, the amplitude of the vibrations 152, or any appropriate combination of these.

At 460, the temperature of the few mode fiber at the second location is determined based on the detecting the collection of backscattered Stokes Raman signals and Anti-Stokes Raman signals.

In some implementations, the process 400 can include demultiplexing from the few mode optical fiber the separated backscattered Rayleigh signals, and providing the demultiplexed Rayleigh signals to a single mode optical fiber, wherein detecting the separated Rayleigh signals also includes detecting the demultiplexed separated Rayleigh signals from the single mode optical fiber. For example, the mode multiplexer 240 can demultiplex the Rayleigh signals that are separated by the WDM 260, from the few mode fiber 250 to the single mode fiber 230a, 230b, . . . , 230n, after which the Rayleigh signals are sensed by the receiver 280a, 280b, . . . , 280n, and processed by the signal processor 282a, 282b, 282n.

In some implementations, the process 400 can also include demultiplexing, from the few mode optical fiber, the separated backscattered Stokes Raman signals and backscattered Anti-Stokes Raman signals, and providing the demultiplexed Stokes Raman signals and Anti-Stokes Raman signals to the single mode optical fiber, wherein detecting the separated Stokes Raman signals and Anti-Stokes Raman signals also includes detecting the demultiplexed separated Stokes Raman signals and Anti-Stokes Raman signals. For example, the mode multiplexer 340 receives backscattered Raman signals from the few mode fiber 350. The mode multiplexer 340 demultiplexes the backscattered Raman signals from the few mode fiber 350 to the single mode fiber 330a, 330b, . . . , 330n. The demultiplexed Stokes Raman signals and Anti-Stokes Raman signals are detected by the receiver 370a, 370b, . . . , 370n, and processed by the signal processor 372.

In some implementations, the process 400 can also include transmitting a collection of optical pulses through a single mode optical fiber at a predetermined frequency, and injecting the optical pulses into the few mode optical fiber as a predetermined mode through a mode multiplexer. For example, the light pulse assembly 201a can emit optical pulses into the single mode fiber 230a. The optical pulses are injected into the few mode optical fiber 250 as mode 0 via the mode multiplexer 340.

In some implementations, transmitting a collection of optical pulses through a single mode optical fiber at a predetermined frequency can include generating, by a light source, continuous-wave light, converting, by a first optical modulator, the continuous-wave light into the collection of optical pulses having the predetermined frequency, amplifying, by an optical amplifier, the collection of optical pulses, directing the optical pulses to a first port of an optical circulator, and directing, by the optical circulator, the optical pulses to a second port of the optical circulator in optical communication with the single mode optical fiber. For example, the light source 210a of the light pulse assembly 201a can emit light into the single mode fiber 212a. The laser light is modulated by the modulator 214a to produce optical pulses. The modulated light is amplified by the optical amplifier 216a. The amplified modulated light is provided to the optical port 222a of the optical circulator 220a. The optical circulator 220a provides the amplified modulated light to the optical port 224a that is optically coupled to the proximal end 232a of the single mode fiber 230a.

In some implementations, the process 400 can also include receiving, at the second port of the optical circulator, the backscattered Rayleigh signals, and directing the backscattered Rayleigh signals to a third port of the optical circulator, wherein detecting the separated Rayleigh signals also includes receiving the separated Rayleigh signals from the third port. For example, the Rayleigh signals are directed by the optical circulator 220a to the optical port 226a that is optically coupled to the receiver 280a for amplification, detection, and data acquisition.

In some implementations, transmitting a collection of optical pulses through an single mode optical fiber at a predetermined frequency can include sub-steps. For example, a first optical transmitter can transmit a first collection of optical pulses through a first single mode optical fiber to a first port of the multiplexer. The process 400 can also include transmitting a second collection of optical pulses through a second single mode optical fiber to a second port of the multiplexer. For example, in the example of FIG. 2A, the light pulse assembly 201a can transmit light pulses to the port 242a, whereas in the example of FIG. 2B, the light pulse assembly 201b can transmit light pulses to the port 242b.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data includes all forms of permanent/non-permanent or volatile/nonvolatile memory, media and memory devices, including by way of example semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto optical disks; and optical memory devices, for example, digital video disc (DVD), CD ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light-emitting diode (LED), or plasma monitor, for displaying information to the user and a keyboard and a pointing device, for example, a mouse, trackball, or trackpad, by which the user can provide input to the computer. Input may also be provided to the computer using a touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a collection of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any embodiment or implementation or on the scope of what may be claimed, but rather as descriptions of features that may be specific to particular implementations of particular embodiments or implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Although a few implementations have been described in detail in the preceding paragraphs, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for remotely sensing vibration and temperature, comprising:
    separating, by a wavelength division multiplexing filter and from a few mode optical fiber, a plurality of backscattered Rayleigh signals based on a vibration of the few mode optical fiber at a vibration frequency at a first location along the few mode optical fiber;
    separating, by the wavelength division multiplexing filter and from the few mode optical fiber, a plurality of backscattered Stokes Raman signals and Anti-Stokes Raman signals based on a temperature of the few mode optical fiber at a second location along the few mode optical fiber;
    detecting the separated Rayleigh signals;
    detecting the separated Stokes Raman signals and Anti-Stokes Raman signals;
    determining, based on the detecting the plurality of backscattered Rayleigh traces, at least one of the first location in the few mode optical fiber of the vibration, the vibration frequency, and an amplitude of the vibration; and
    determining, based on the detecting the plurality of backscattered Stokes Raman signals and Anti-Stokes Raman signals, the temperature of the few mode fiber at the second location.

2. The method of claim 1, further comprising:
    demultiplexing, from the few mode optical fiber, the separated backscattered Rayleigh signals; and providing the demultiplexed Rayleigh signals to a single mode optical fiber;

wherein detecting the separated Rayleigh signals further comprises detecting the demultiplexed separated Rayleigh signals from the single mode optical fiber.

3. The method of claim 2, further comprising:

demultiplexing, from the few mode optical fiber, the separated backscattered Stokes Raman signals and backscattered Anti-Stokes Raman signals; and providing the demultiplexed Stokes Raman signals and Anti-Stokes Raman signals to the single mode optical fiber;

wherein detecting the separated Stokes Raman signals and Anti-Stokes Raman signals further comprises detecting the demultiplexed separated Stokes Raman signals and Anti-Stokes Raman signals.

4. The method of claim 1, further comprising:

transmitting a plurality of optical pulses through a single mode optical fiber at a predetermined frequency; and injecting the optical pulses into the few mode optical fiber as a predetermined mode through a mode multiplexer.

5. The method of claim 4, wherein transmitting a plurality of optical pulses through a single mode optical fiber at a predetermined frequency comprises:

generating, by a light source, continuous-wave light;

converting, by a first optical modulator, the continuous-wave light into the plurality of optical pulses having the predetermined frequency;

amplifying, by an optical amplifier, the plurality of optical pulses;

directing the optical pulses to a first port of an optical circulator; and directing, by the optical circulator, the optical pulses to a second port of the optical circulator in optical communication with the single mode optical fiber.

6. The method of claim 5, further comprising:

receiving, at the second port of the optical circulator, the backscattered Rayleigh signals; and directing the backscattered Rayleigh signals to a third port of the optical circulator;

wherein detecting the separated Rayleigh signals further comprises receiving the separated Rayleigh signals from the third port.

7. The method of claim 4, wherein transmitting a plurality of optical pulses through an single mode optical fiber at a predetermined frequency comprises transmitting, by a first optical transmitter, a first plurality of optical pulses through a first single mode optical fiber to a first port of the multiplexer, and the method further comprises transmitting a second plurality of optical pulses through a second single mode optical fiber to a second port of the multiplexer.

8. A vibration and temperature sensor system comprising:

a first single mode optical fiber;

a few mode optical fiber having a predetermined length;

a first light pulse generator configured to provide a first plurality of optical pulses to the single mode optical fiber;

a multiplexer configured to multiplex optical pulses, received from the first single mode optical fiber at a first multiplexer port, to the few mode optical fiber;

a wavelength division multiplexing filter configured to receive and separate, from the few mode optical fiber, backscattered Rayleigh signals, backscattered Stokes Raman signals, and backscattered Anti-Stokes Raman signals;

a demultiplexer configured to demultiplex at least one of backscattered Rayleigh signals, backscattered Stokes Raman signals, and backscattered Anti-Stokes Raman signals, from the few mode fiber to the first single mode fiber at a first demultiplexer port;

a first sensor configured to determine at least one of a first location of a vibration in the few mode optical fiber, a frequency of the vibration, and an amplitude of the vibration, based on the backscattered Rayleigh signals;

a second sensor configured to determine at least one of a second location in the few mode fiber and a temperature at the second location, based on backscattered Stokes Raman signals and backscattered Anti-Stokes Raman signals.

9. The vibration sensor of claim 8, wherein the first sensor is configured to receive demultiplexed backscattered Rayleigh signals from the demultiplexer at the first demultiplexer port.

10. The vibration sensor of claim 8, wherein the second sensor is configured to receive demultiplexed backscattered Stokes Raman signals and demultiplexed backscattered Anti-Stokes Raman signals from the demultiplexer at the first demultiplexer port.

11. The vibration sensor of claim 8, wherein the second sensor is configured to receive separated backscattered Stokes Raman signals and separated backscattered Anti-Stokes Raman signals from the wavelength division multiplexing filter.

12. The vibration sensor of claim 8, further comprising:

a second single mode optical fiber;

a second light pulse generator configured to provide a second plurality of optical pulses to the single mode optical fiber, wherein the multiplexer is further configured to multiplex optical pulses, received from the second single mode optical fiber at a second multiplexer port, to the few mode optical fiber, and wherein the demultiplexer is further configured to demultiplex at least one of backscattered Rayleigh signals, backscattered Stokes Raman signals, and backscattered Anti-Stokes Raman signals, from the few mode fiber to the second single mode fiber at a second demultiplexer port;

a third sensor configured to determine at least one of a third location in the few mode fiber and a temperature at the third location, based on backscattered Stokes Raman signals and backscattered Anti-Stokes Raman signals.

13. The vibration sensor of claim 12, wherein the third sensor is configured to receive demultiplexed backscattered Stokes Raman signals and demultiplexed backscattered Anti-Stokes Raman signals from the demultiplexer at the second demultiplexer port.

14. The vibration sensor of claim 12, wherein the third sensor is configured to receive separated backscattered Stokes Raman signals and separated backscattered Anti-Stokes Raman signals from the wavelength division multiplexing filter.

15. The vibration sensor of claim 12, further comprising a fourth sensor configured to determine at least one of a fourth location of a vibration in the few mode optical fiber, a frequency of the vibration, and an amplitude of the vibration, based on the backscattered Rayleigh signals.

16. The vibration sensor of claim 15, wherein the fourth sensor is configured to receive demultiplexed backscattered Rayleigh signals from the demultiplexer at the second demultiplexer port.

17. A non-transitory computer storage medium encoded with a computer program, the program comprising instructions that when executed by data processing apparatus cause the data processing apparatus to perform operations comprising:

separating, by a wavelength division multiplexing filter and from a few mode optical fiber, a plurality of backscattered Rayleigh signals based on a vibration of the few mode optical fiber at a vibration frequency at a first location along the few mode optical fiber;

separating, by the wavelength division multiplexing filter and from the few mode optical fiber, a plurality of backscattered Stokes Raman signals and Anti-Stokes Raman signals based on a temperature of the few mode optical fiber at a second location along the few mode optical fiber;

detecting the separated Rayleigh signals;

detecting the separated Stokes Raman signals and Anti-Stokes Raman signals;

determining, based on the detecting the plurality of backscattered Rayleigh traces, at least one of the first location in the few mode optical fiber of the vibration, the vibration frequency, and an amplitude of the vibration; and determining, based on the detecting the plurality of backscattered Stokes Raman signals and Anti-Stokes Raman signals, the temperature of the few mode fiber at the second location.

18. The non-transitory computer storage medium of claim 17, the operations further comprising:

demultiplexing, from the few mode optical fiber, the separated backscattered Rayleigh signals; and providing the demultiplexed Rayleigh signals to a single mode optical fiber;

wherein detecting the separated Rayleigh signals further comprises detecting the demultiplexed separated Rayleigh signals from the single mode optical fiber.

19. The non-transitory computer storage medium of claim 18, the operations further comprising:

demultiplexing, from the few mode optical fiber, the separated backscattered Stokes Raman signals and backscattered Anti-Stokes Raman signals; and providing the demultiplexed Stokes Raman signals and Anti-Stokes Raman signals to the single mode optical fiber;

wherein detecting the separated Stokes Raman signals and Anti-Stokes Raman signals further comprises detecting the demultiplexed separated Stokes Raman signals and Anti-Stokes Raman signals.

20. The non-transitory computer storage medium of claim 17, the operations further comprising:

transmitting a plurality of optical pulses through a single mode optical fiber at a predetermined frequency; and injecting the optical pulses into the few mode optical fiber as a predetermined mode through a mode multiplexer.

21. The non-transitory computer storage medium of claim 20, wherein transmitting a plurality of optical pulses through a single mode optical fiber at a predetermined frequency comprises:

generating, by a light source, continuous-wave light;

converting, by a first optical modulator, the continuous-wave light into the plurality of optical pulses having the predetermined frequency;

amplifying, by an optical amplifier, the plurality of optical pulses;

directing the optical pulses to a first port of an optical circulator; and directing, by the optical circulator, the optical pulses to a second port of the optical circulator in optical communication with the single mode optical fiber.

22. The non-transitory computer storage medium of claim 21, the operations further comprising:

receiving, at the second port of the optical circulator, the backscattered Rayleigh signals; and directing the backscattered Rayleigh signals to a third port of the optical circulator;

wherein detecting the separated Rayleigh signals further comprises receiving the separated Rayleigh signals from the third port.

23. The non-transitory computer storage medium of claim 20, wherein transmitting a plurality of optical pulses through an single mode optical fiber at a predetermined frequency comprises transmitting, by a first optical transmitter, a first plurality of optical pulses through a first single mode optical fiber to a first port of the multiplexer, and the method further comprises transmitting a second plurality of optical pulses through a second single mode optical fiber to a second port of the multiplexer.

* * * * *